United States Patent [19]

Castleberry

[11] 4,399,548

[45] Aug. 16, 1983

[54] COMPRESSOR SURGE COUNTER

[76] Inventor: Kimberly N. Castleberry, Harriman, Tenn., granted to U.S. Department of Energy under the provisions of 42 U.S.C. 2182

[21] Appl. No.: 253,625

[22] Filed: Apr. 13, 1981

[51] Int. Cl.³ .............................................. G01M 7/00
[52] U.S. Cl. ..................................... 377/16; 377/23; 340/683
[58] Field of Search ........ 235/92 FL, 92 CT, 92 NT, 235/92 MT; 340/682, 683; 377/16

[56] References Cited

U.S. PATENT DOCUMENTS

| | | | |
|---|---|---|---|
| 3,641,550 | 2/1972 | Lynas et al. | 340/683 |
| 3,677,072 | 7/1972 | Weichbrodt et al. | 340/683 |
| 3,758,758 | 9/1973 | Games et al. | 340/683 |
| 3,775,763 | 11/1973 | Couch et al. | 340/683 |
| 3,955,070 | 5/1976 | Suzuki et al. | 377/19 |

Primary Examiner—Felix D. Gruber
Assistant Examiner—D. H. Rutherford
Attorney, Agent, or Firm—David E. Breeden; Stephen D. Hamel; Richard G. Besha

[57] ABSTRACT

A surge counter for a rotating compressor is provided which detects surging by monitoring the vibration signal from an accelerometer mounted on the shaft bearing of the compressor. The circuit detects a rapid increase in the amplitude envelope of the vibration signal, e.g., 4 dB or greater in less than one second, which is associated with a surge onset and increments a counter. The circuit is rendered non-responsive for a period of about 5 seconds following the detection which corresponds to the duration of the surge condition. This prevents multiple registration of counts during the surge period due to rapid swings in vibration amplitude during the period.

4 Claims, 2 Drawing Figures

COMPRESSOR SURGE COUNTER

BACKGROUND OF THE INVENTION

This invention relates generally to vibration monitoring instrumentation for fluid compressors and more particularly to an instrument for monitoring compressor vibration to detect and record compressor surging. This invention is a result of a contract with the United States Department of Energy.

In fluid-processing systems, such as a gaseous diffusion system for separating isotopes, which require a larger number of rotating, constant flow compressors, such as axial flow or centrifugal type for flow control, the compressors are designed to operate under certain well-defined stable flow conditions. When the flow becomes unstable due to shutdown of a stage in the system, plugging of a stage, various scheduled changes in flow conditions, or other flow disturbing problems in such a system, compressors in the system will surge. Compressor surge may be defined as a large amplitude, low-frequency oscillation of the total annulus-averaged flow through the compressor. Each time a compressor surges the compressor blades and seals are subjected to very high stresses. Excessive surging may eventually weaken the compressor blades to a point that deblading is possible.

Therefore, these compressors are designed to withstand a limited number of surges over an estimated life span. However, the actual number of surges a compressor may experience in a selected period is not known. In a diffusion cascade, for example, the only method for counting compressor surges involves human interpretation of flow parameters. Therefore, in order to obtain a definite record as to the frequency and total number of times a compressor experiences surging during operation, there is a need for instrumentation to count surges in constant flow-type compressors to aid in scheduling compressor blade and seal maintenance or predict life expectancy of a compressor in a given system.

SUMMARY OF THE INVENTION

In view of the above need, it is an object of this invention to provide instrumentation for counting surges in a rotating compressor.

Other objects and many of the attendant advantages of the present invention will be obvious from the following detailed description of a preferred embodiment of the invention.

To achieve the foregoing and other objects and in accordance with the purpose of the present invention, as embodied and broadly described herein, the compressor surge counter of this invention may comprise means for detecting vibration in the compressor and generating an output signal indicative of the amplitude of vibration. A rate of change in amplitude envelope is monitored by a signal rate monitoring means. An amplitude responsive means is provided for detecting a preselected increase in the amplitude of the rate of change signal to qualify the detected rise in amplitude as a surge condition. Once a surge condition is detected, the circuit is rendered not responsive to further amplitude and rate change detections for a preselected period corresponding to a known surge period. During this period, an output circuit is activated to increment a counter which registers the surge count.

Since it is known that a surge condition will last a definite period, typically, a few seconds, in a particular compressor, rendering the circuit non-responsive for that period will prevent false counts due to amplitude fluctuations during the surge condition period.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

Figure 1:
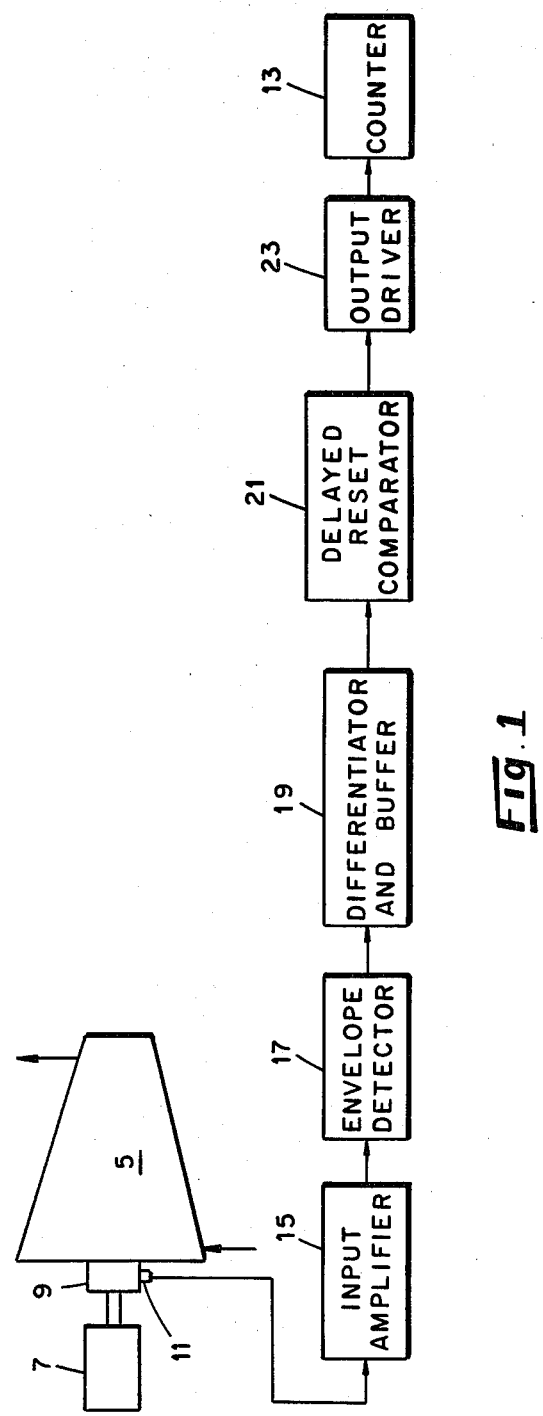
FIG. 1 is a schematic block diagram illustration of a rotating compressor surge counter according to the present invention.

Referring now to FIG. 1, there is shown schematically an axial flow turbine 5 driven by a motor 7 through a drive bearing assembly 9. An accelerometer 11 is mounted on the drive shaft bearing assembly 9 to monitor the rotating compressor vibration. The accelerometer output signal has an amplitude and frequency corresponding to the compressor vibration magnitude and frequency. The amplitude envelope associated with the signal produced by the accelerometer will increase typically between 4 and 6 dB in less than one second during the onset of surge in a typical axial flow diffusion cascade compressor, for example. While other events often cause slower amplitude envelope changes of possibly the same magnitude, these changes are discriminated by the surge counter circuit of this invention by detecting the rate of increase of the amplitude envelope. Amplitude increases that exceed a preselected magnitude in less than one second will trigger the circuit to increment a counter 13.

Since a surge duration may contain several fast amplitude changes, the counter circuit, once triggered to increment the counter, ignores all other changes over a selected period of time, typically five seconds. This time interval is long enough to avoid multiple counts from a single surge but allows the circuit to recover in time to detect subsequent surges.

The signal from the accelerometer is fed to an input amplifier 15 which raises the typical 100 mv/g input signal to 400 mv/g. The amplified signal is then fed to an amplitude envelope detector 17 whose output is frequency limited to about 2 Hz. The change in amplitude must occur in less than 1 second to obtain a significant change in the detector 17 output level.

The output of the detector 17 is supplied to a differentiator and buffer amplifier stage 19 which is biased to detect and amplify an increase in the envelope signal at the detector 17 output which is within the restricted rate limit. This signal is then applied to a delayed reset comparator 21 which has a preselected amplitude threshold setting corresponding to a preselected change in amplitude within the selected time frame (less than 1 second) to indicate the onset of surge in the compressor 5. Once the comparator threshold is exceeded, it is rendered non-responsive for a period of about 5 seconds, at which time the surge condition has subsided.

Each time the comparator threshold is exceeded, an output driver circuit 23 is activated to increment the counter 13. The counter 13 may take various forms, such as an electromechanical counter which is driven by the output drive circuit 23.

Figure 2:
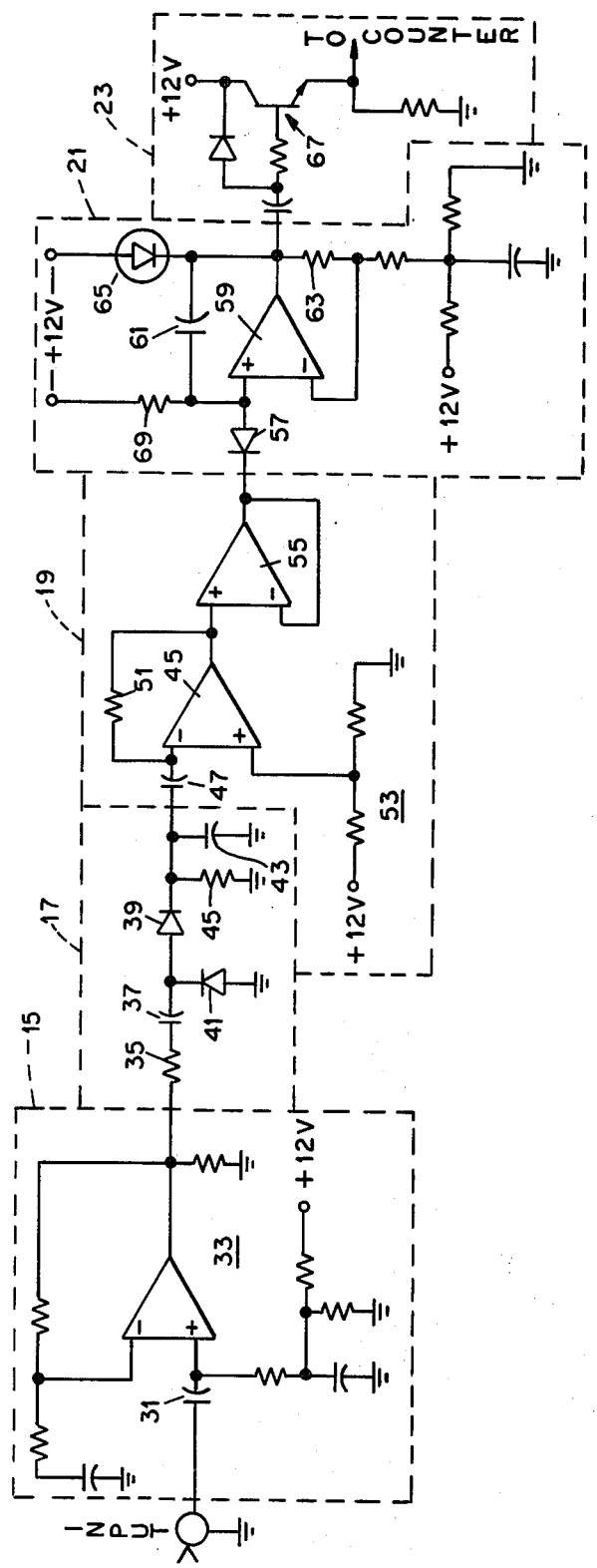
FIG. 2 is a detailed schematic diagram of the circuit components shown in the block form in FIG. 1.

Referring now to FIG. 2, the circuits of the system components of FIG. 1 (outlined by like numbered dashed lines) are shown in detail. The vibration signal from the accelerometer 11 of FIG. 1 is applied through a coupling capacitor 31 to a non-inverting amplifier 33 which has a gain of about 4 to raise the typical 100 mv/g signal at the input to 400 mv/g at the output.

The output of amplifier 33 is connected to the amplitude envelope detector 17. A series resistor 35 and coupling capacitor 37 are series connected at the input to a diode rectifier circuit formed of diodes 39 and 41. The negative portions of the input signals are shunted to ground through diode 41 while the positive portions pass through diode 39 to charge a capacitor 43 connected between the cathode of diode 39 and ground potential. A resistor 45 is connected in parallel with capacitor 43 to provide the proper rate of discharge for capacitor 43.

The ungrounded side of capacitor 43 is connected through a capacitor 47 to the inverting input of an operational amplifier 49. The amplifier 49 is connected to form a differentiator by means of a feedback resistor 51 connected between the output and the inverting input thereof and the series input capacitor 47. The non-inverting input of amplifier 49 is connected to a voltage-biasing circuit 53. The output of amplifier 49 is connected through a voltage follower 55 to buffer the output of the differentiator.

The output of the voltage follower 55 is connected to the cathode of a diode 57 in the input of the comparator circuit 21. The anode of diode 57 is connected to the non-inverting input of an operational amplifier 59. The amplifier 59 is connected as a delayed reset comparator by means of a feedback capacitor 61 connected between the output and the non-inverting input thereof. Further, the output is connected to the inverting input through a feedback resistor 63.

Voltage-biasing circuits are connected to the inputs of amplifier 59 to control the preselected input voltage threshold at which the comparator is triggered. A light emitting diode 65 may be connected in an output circuit of the amplifier 59 which is turned "on" each time the comparator is triggered to indicate that the monitored compressor is in surge.

The output of amplifier 59 is connected to the output driver 23. The driver circuit includes a transistor switch 67 which conducts each time the comparator 21 is triggered and applies a signal to the counter 13 to increment the count.

In operation, the amplitude envelope of the vibration signal from an operating compressor 5 is detected by the envelope detector 17. The capacitor 43 of the envelope detector is charged through the resistor 35. The capacitor 43 and resistor 35 RC charging time constant and the discharging resistor 45, forming the RC discharging time constant, are selected so that the capacitor voltage essentially corresponds to the positive amplitude envelope. A rapid increase in the envelope voltage indicative of the onset of surge (a 4 dB increasde in less than 1 second), coupled through capacitor 47 of the differentiator 19, will cause a correspondingly large negative-going derivative signal to be passed to the input of the comparator 21. This large negative-going input to the comparator will exceed the comparator threshold and trigger the comparator 21. Thus, it will be seen that a more gradual change in the amplitude envelope of the vibration signal from changes in operating conditions not related to surge will not produce a large derivative signal and, therefore, not trigger the comparator.

Once the output of the differentiator goes sufficiently low, it causes the non-inverting input of the comparator amplifier 59 to go below the threshold level determined by the bias applied to the comparator amplifier 59. This causes the output of amplifier 59 to go low, turning "on" the transistor 67 to increment the counter 13. The comparator is rendered non-responsive for at least 5 seconds by means of the value of the timing capacitor 61. The low going output voltage of amplifier 59 is impressed on the non-inverting input, holding it low until the capacitor 61 discharges through resistor 69. Since the discharge resistance is very high, the capacitor 61 discharges very slowly, thus, easily providing the 5 second delayed reset period. The diode 57 prevents discharging of the capacitor through the buffer 55 output.

Thus, it will be seen that a surge counter for use with a rotating compressor is provided that detects a surge condition from the vibration pattern of the compressor monitored by an accelerometer mounted on the compressor shaft bearing.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A surge counter in combination with a rotating compressor, comprising:
   vibration sensing means for generating an analog signal indicative of vibration of said rotating compressor;
   an amplitude envelope monitoring means for generating an output rate signal proportional to the rate of change of the amplitude envelope of said analog signal;
   delayed reset comparator circuit means responsive to a preselected level of said output rate signal for generating a count increment signal when said output rate signal exceeds said preselected level and remaining non-responsive for a delay period corresponding to a known period of surge duration in said rotating compressor; and
   a counter connected to receive said count increment signal.

2. The surge counter of claim 1 wherein said rotating compressor includes a rotating shaft bearing and said vibration sensing means comprises an accelerometer mounted on said rotating shaft bearing.

3. The surge counter of claim 2 wherein said amplitude envelope monitoring means includes an amplitude envelope detector connected to receive said analog signal from said accelerometer and a differentiator circuit connected to receive said output rate signal from said envelope detector.

4. The surge counter of claim 3 wherein said delayed reset comparator circuit means includes a voltage comparator amplifier having a preselected input amplitude threshold for generating said count increment signal at an output thereof when the amplitude of said output rate signal applied to an input thereof exceeds said input amplitude threshold, a diode connected in series between the output of said differentiator circuit and said input of said voltage comparator amplifier to allow said rate signal to be applied to said input of said voltage comparator amplifier, a capacitor connected between said output and said voltage input of said comparator amplifier voltage, and a resistive discharging circuit connected to said capacitor for controlling the rate of discharge of said capacitor following the generation of a count increment signal, so that said voltage comparator amplifier is held non-responsive for said delay period.

* * * * *